(12) United States Patent
Lin et al.

(10) Patent No.: US 6,207,132 B1
(45) Date of Patent: Mar. 27, 2001

(54) PROCESS FOR PRODUCING HIGH PURITY HYDROGEN

(75) Inventors: Yu-Ming Lin, Hsinchu Hsien; Min-Hon Rei, Taipei, both of (TW)

(73) Assignee: Chinese Petroleum Corporation, Taipei (TW)

( * ) Notice: Subject to any disclaimer, the term of this patent is extended or adjusted under 35 U.S.C. 154(b) by 0 days.

(21) Appl. No.: 09/206,126

(22) Filed: Dec. 4, 1998

(51) Int. Cl.[7] .................................. C01B 3/02; C01B 3/26
(52) U.S. Cl. ....................... 423/648.1; 423/652; 423/653
(58) Field of Search .................. 422/177; 423/648.1, 423/652, 653

(56) References Cited

U.S. PATENT DOCUMENTS

| | | | |
|---|---|---|---|
| 3,278,268 | * 10/1966 | Pfefferle, Jr. | 423/652 |
| 4,981,676 | * 1/1991 | Minet et al. | 423/652 |
| 5,229,102 | 7/1993 | Minet et al. . | |
| 5,451,386 | 9/1995 | Collins et al. . | |
| 5,525,322 | * 6/1996 | Willms | 423/653 |
| 5,637,259 | * 6/1997 | Galvszka et al. | 423/652 |
| 5,674,301 | 10/1997 | Sakai et al. . | |
| 5,741,474 | 4/1998 | Isomura et al. . | |

FOREIGN PATENT DOCUMENTS

| | | |
|---|---|---|
| 0 715 880 | 6/1996 | (EP) . |
| 06040703 | 2/1994 | (JP) . |
| 6-40703 | 2/1994 | (JP) . |

OTHER PUBLICATIONS

Shu J. et al., "Simultaneous Deposition Of PD and AG on Porous Stainless Steel by Electroless Plating" Journel of Membrane Science, vol. 77, No. 2/03, Mar. 4, 1993, pp. 181–195.

* cited by examiner

*Primary Examiner*—Wayne Langel
(74) *Attorney, Agent, or Firm*—Knobbe, Martens, Olson & Bear, LLP

(57) ABSTRACT

An apparatus for producing hydrogen includes at least one reforming chamber containing a reforming catalyst bed for reforming a carbonaceous fuel into hydrogen, at least one hydrogen-permeable membrane tube disposed inside the reforming chamber to be surrounded by the reforming catalyst bed and to confine therein a hydrogen compartment, and at least one oxidation chamber provided adjacent to the reforming catalyst bed for burning the gas not permeable to the membrane tube and for supplying heat to the reforming chamber. The oxidation chamber has an oxidation catalyst bed. A process for producing hydrogen via the apparatus is also disclosed.

7 Claims, 2 Drawing Sheets

PROCESS FOR PRODUCING HIGH PURITY HYDROGEN

BACKGROUND OF THE INVENTION

1. Field of the Invention

The present invention relates to a process and apparatus for producing high purity hydrogen by steam-reforming a carbonaceous fuel. The apparatus comprises a reforming chamber provided with a hydrogen-permeable membrane tube, and an oxidation chamber with an oxidation catalyst bed disposed therein.

2. Description of the Related Art

Steam-reforming of hydrocarbon or carbonaceous fuels, such as methanol, ethanol, gasoline, petroleum and the like, for producing hydrogen for various applications are known in the art. This invention is particularly concerned with steam-reforming of carbonaceous fuels to generate hydrogen for use in fuel cell for electric vehicles and on-site electric power plants.

Steam-reforming of hydrocarbon, such as methanol, is a reversible and endothermic reaction. Thus, heat must be supplied to allow the reaction to proceed and to allow the reaction to reach the equilibrium state. The maximum yield of a reforming reaction can only be reached at the equilibrium state of the reaction. Due to the poor yield at low temperature, the temperature of the steam-reforming reaction often requires the temperature to be raised to 700–900° C. in order to obtain a satisfactory hydrogen yield. Such high reaction temperatures can be reduced upon interrupting the equilibrium state by withdrawing one of the products during the progress of the reaction, while maintaining the same yield.

Traditionally, the purity of hydrogen obtained from the steam-reforming of carbonaceous fuels normally reaches to about 70%, which requires further purification, for example to a level of greater than 95% purity, before application to the fuel cells for technical and economic feasibility.

High purity hydrogen can be obtained by using a thin metal layer of palladium or palladium-alloy membrane as seen in the semiconductor industry. However, such membranes are impractical for application on an industrial scale because of their low hydrogen flux which would result in a demand of greater surface area of the membrane and tremendous expense. Furthermore, the thickness of such thin metal layer is normally too thin to possess sufficient mechanical strength during application, especially under elevated temperatures and pressures.

U.S. Pat. No. 5,451,386 discloses a hydrogen-selective membrane comprising a tubular porous ceramic support having a palladium metal layer deposited on an inside surface of the ceramic support. Using such membrane can provide a hydrogen flux and hydrogen selectivity that is significantly higher than the traditional membranes described above and can possess good mechanical strength for high temperature hydrogen separations, such as when applied in the promotion of ammonia decomposition. While the ceramic supported membrane exhibits a mechanical strength that can be used at high temperatures and pressures, the thickness of the palladium layer of the membrane has to be greater than 10 $\mu$m to avoid any defects from taking place. Such limitation would restrict the promotion of hydrogen flux which requires a reduction in thickness of the palladium layer of the membrane.

According to the aforesaid U.S. patent, in Buxbaum et al. it is disclosed that a 2 $\mu$m thick of palladium film deposited on a niobium disk fails when applied in the extractions of hydrogen at temperatures above about 500° C. because of the diffusion of niobium into the palladium metal under such high temperatures, and eventually becomes impermeable to hydrogen.

U.S. Pat. No. 5,741,474 discloses a system for producing high-purity hydrogen by reforming a hydrocarbon and/or an oxygen atom-containing hydrocarbon to form a reformed gas containing hydrogen and by separating the hydrogen from the reformed gas. Such system includes a reforming chamber provided with a catalyst for steam-reforming and partial oxidation, and a hydrogen-separating membrane, such as a palladium or palladium-silver alloy membrane. The heat generated by the partial oxidation maybe used as heat to continue the reforming by cooperating with the heat generated by the burning of the non-permeated gas. The burning of the non-permeated gas would, however, require additional fuels to burn the gas. Also, the burning often needs to employ an extremely high temperature, which implies a need of special materials for construction and for prevention of a significant amount of heat loss. Furthermore, the burning of the non-permeated gas in this process is unable to convert completely the gas into a non-polluting gas for discharge into environment.

SUMMARY OF THE INVENTION

Therefore, it is an object of the present invention to provide a process and apparatus for producing high-purity hydrogen by reforming a hydrocarbon, that would be capable of overcoming the disadvantages described above.

According to one aspect of the present invention, an apparatus for producing high purity hydrogen by steam-reforming a carbonaceous fuel comprises: at least one reforming chamber containing a reforming catalyst bed for catalyzing the formation of hydrogen from the carbonaceous fuel via a steam-reforming reaction; at least one hydrogen-permeable membrane tube disposed inside the reforming chamber to be surrounded by the reforming catalyst bed and to confine therein a hydrogen compartment, the membrane tube being permeable to hydrogen, thereby permitting the hydrogen formed within the reforming catalyst bed to enter the hydrogen compartment; and at least one oxidation chamber provided adjacent to the reforming catalyst bed for burning the gas not permeable to the membrane tube and for supplying heat to the reforming chamber, the oxidation chamber having an oxidation catalyst bed, and being spaced apart from the membrane tube by at least a portion of the reforming catalyst bed.

According to another aspect of the invention, a process for producing high purity hydrogen by steam-reforming a carbonaceous fuel and by instantaneous separation of hydrogen, comprises the steps: providing a reforming chamber which contains a reforming catalyst bed, and a hydrogen-permeable membrane tube which is disposed inside the reforming chamber so as to be surrounded by the reforming catalyst bed, the membrane tube confining a hydrogen compartment; providing an oxidation chamber adjacent to the reforming chamber, and an oxidation catalyst bed inside the oxidation chamber; feeding a mixture including the carbonaceous fuel into the reforming catalyst bed to undergo a steam-reforming reaction which produces hydrogen and the other reformed gases; withdrawing hydrogen from the hydrogen compartment; and allowing the other reformed gases to enter the oxidation chamber and catalytically oxidating the other reformed gases to form a non-polluting gas.

The hydrogen-permeable membrane tube used in the present invention includes a porous substrate and a thin metal layer which is preferably selected from the group consisting of palladium and a palladium alloy and which is deposited on the surface of the substrate. The porous substrate is selected from the group consisting of a porous stainless steel and a porous ceramic material. The substrate has a thickness that ranges from 0.5 mm to 2 mm. The thin metal layer has a thickness of 1 to 20 $\mu$m.

The reforming catalyst bed is selected from the group consisting of a copper-based catalyst, an iron-based catalyst, and a nickel-based catalyst. The oxidation catalyst bed comprises a catalyst selected from the group consisting of palladium and platinum. The steam-reforming reaction of the carbonaceous fuel may be carried out at a temperature of 250 to 550° C. The reformed hydrogen is withdrawn under a transmembrane pressure difference of 2 to 20 atm. The carbonaceous fuel is selected from the group consisting of methanol, ethanol, gasoline, petroleum, and the mixtures thereof. In an embodiment of the present invention, the mixture fed to the reforming chamber includes methanol and steam. The methanol is fed at a WHSV of from 0.5 to 30 h$^{-1}$, and the mole ratio of steam to methanol ranges from 1 to 2.

Due to the use of the oxidation catalyst bed in the oxidation chamber in the present invention, it is feasible to use a much lower temperature for the oxidation of the fuel and the non-permeated reformed gas, which is used to supply heat to the reforming chamber. In addition, the non-permeated reformed gas can be converted completely into a non-polluting gas without using any extra equipment for treating the non-permeated gas, which is generally a waste emission.

The present invention can provide a high hydrogen permeation flux that allows both the reforming temperature and the transmembrane pressure difference to be reduced to a lower level. With a high hydrogen permeation flux, the conversion rate of the carbonaceous fuel or hydrocarbon can be increased, even up to 90% and above. The reduced temperature and transmembrane pressure difference can provide the benefits of using less expensive material for the entire reactor, saving heat energy, and reducing undesirable effects on the mechanical strength and stability of the hydrogen-permeable membrane. Furthermore, such a high hydrogen permeation flux can provide the feasibility of reducing the apparatus's volume to a more compact unit that is suitable for connecting to a fuel cell system for application in an electric vehicle or an on-site electric power plant.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE INVENTION

The present invention is hereinafter described specifically by way of Examples with reference to the drawings.

Figure 1:
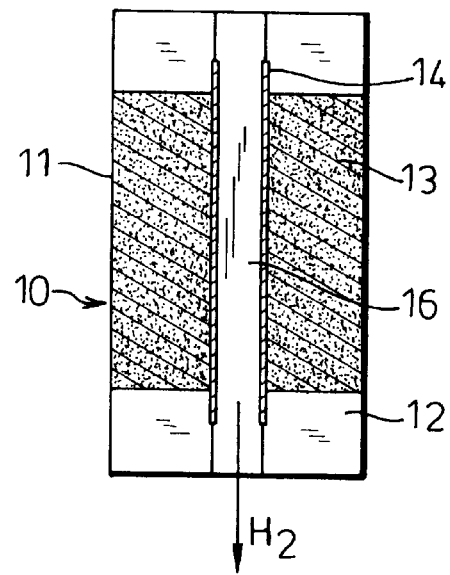
FIG. 1 is a schematic view which illustrates a single jacket tubular reactor or apparatus constructed according to the present invention.

As shown in FIG. 1, an apparatus according to the present invention is formed as a single-jacket tubular reactor 10 which comprises an outer tube 11 containing a reforming chamber 12 provided with a reforming catalyst bed 13 therein, and an inner tube 14 extending longitudinally through and being surrounded by the reforming catalyst bed 13. The inner tube 14 is a supported membrane tube which confines therein a hydrogen compartment 16.

EXAMPLE 1

In this example, tests were done on the apparatus shown in FIG. 1. The inner tube or supported membrane tube 14 is a supported palladium membrane tube which was electroless plated on the outer surface of a porous stainless steel support. The porous stainless steel support was purchased from Mott Metallurgical Corp., a US-based company. The stainless steel support has a thickness of 1 mm with a filtration grade of 0.5 $\mu$m. The thickness of the palladium layer is about 15 $\mu$m. The prepared supported palladium membrane tube was tested under various temperatures and pressures. The hydrogen permeation behavior for this supported membrane was observed following Sieverts' law. The measured permeability of hydrogen was in a range of 3–10 m$^3$/m$^2$-h-atm$^{0.5}$, and the selectivity of H$_2$/N$_2$ ranges from 100 to 5,000. Experiments were conducted by using three supported palladium membrane tubes labeled as membrane #1, #2 and #3.

In the experiments, hydrogen and nitrogen were fed at one outer tube 11 into the reforming chamber 12, and the hydrogen in the reforming chamber 12 was continuously withdrawn into the hydrogen compartment 16 via a transmembrane pressure difference between the reforming chamber 12 and the hydrogen compartment 16. The non-permeated gas in the reforming chamber 12 flows out of the outer tube 11.

The hydrogen permeation fluxes (flow rate of permeate hydrogen over unit surface area of the membrane) and selectivity of H$_2$/N$_2$ (ratio of single gas permeation fluxes of H$_2$ and N$_2$) at various temperatures and pressures are presented in Table I, II and III. The permeate side (downstream side) of the supported membrane was fixed at atmospheric pressure.

TABLE I

Membrane #1
operating temperature 350° C.
1 atm at the hydrogen compartment

| Transmembrane Pressure difference, atm | 3 | 6 | 9 | 11 |
|---|---|---|---|---|
| Permeability of $H_2$, $m^3/m^2$ - h | 4.29 | 7.41 | 10.20 | 11.89 |
| Selectivity, $H_2/N_2$ | 3508 | 3977 | 3037 | 2831 |

TABLE II

Membrane #2
Transmembrabe Pressure difference, 6 atm
1 atm at the hydrogen compartment

| Operating temperature, ° C. | 350 | 375 | 400 | 450 |
|---|---|---|---|---|
| Permeability of $H_2$, $m^3/m^2$ - h | 4.35 | 5.01 | 5.64 | 6.47 |
| Selectivity, $H_2/N_2$ | 224 | 235 | 252 | 284 |

TABLE III

Membrane #3
Transmembrabe Pressure difference, 3 atm
1 atm at the hydrogen compartment

| operating temperature, ° C. | 250 | 300 | 325 | 350 | 375 |
|---|---|---|---|---|---|
| Permeability of $H_2$, $m^3/m^2$ - h | 4.27 | 5.25 | 5.86 | 6.24 | 6.90 |
| Selectivity, $H_2/N_2$ | 96 | 127 | 157 | 183 | 195 |

EXAMPLE 2

Additional tests were made by using the apparatus of FIG. 1 and the supported membrane tube prepared in Example 1 in order to investigate the hydrogen permeability of the supported membrane tube. The operation temperature was 350° C. The concentrations of the hydrogen and nitrogen were 50%, respectively. The pressure in the hydrogen compartment was 1–2 atm. The purity of the permeated hydrogen was 99.5% and above. The results of the tests are indicated below in TABLE IV.

TABLE IV

| Permeating flux of hydrogen, $H_2$, | Pressure in the hydrogen compartment, atm | |
|---|---|---|
| $m^3/m^2$ - h | 1 | 2 |
| Pressure in the reforming chamber, atm | | |
| 3 | 0.53 | — |
| 3.7 | 0.78 | — |
| 4.5 | 0.98 | 0.17 |
| 5 | 1.13 | 0.41 |
| 5.7 | — | 0.77 |

TABLE IV shows the feasibility of operating at an elevated pressure in the hydrogen compartment. This feasibility can permit a saving in compressing energy in the subsequent step of compressing the produced hydrogen into an pressurized container.

EXAMPLE 3

A comparison of the hydrogen concentration in the effluent of the single-jacket tubular reactor 10 shown in FIG. 1 with that of a conventional reactor, which has no membrane tube, was made in this example.

Referring to FIG. 1, carbonaceous fuels and water are fed at one end of the outer tube 11 into the reforming chamber 12 to undergo the steam-reforming reaction by the reforming catalyst. The hydrogen present in the reformed gas in the reforming chamber 12 was continuously withdrawn into the hydrogen compartment 16 during the progress of the reforming by virtue of the transmembrane pressure difference between the reforming chamber 12 and the hydrogen compartment 16. The hydrogen not entering into the hydrogen compartment and the remaining gas in the reformed gas are discharged as an effluent.

The operating conditions for both the single-jacket reactor 10 and the conventional reactor are the same. The reforming catalyst used for steam-reforming is a copper-zinc catalyst marked as G66B manufactured by Nissan Girdler Company. The operating temperature is 350° C. Methanol is used as the raw material for steam-reforming, and has a WHSV(weight hourly space velocity) of 8 $h^{-1}$ when fed into the reactor. The steam-to-carbon mole ratio is 1.2:1.

The results of the operations are indicated in TABLE V.

TABLE V

| | MeOH conv., | $H_2$ flux, | $H_2$ purity, | Rejected flux, | effluent comp., Vol % | | |
|---|---|---|---|---|---|---|---|
| | Wt % | $m^3/m^2$ - h | % | $m^3/m^2$ - h | $H_2$ | CO | $CO_2$ |
| Apparatus of FIG. 1 | 100 | 2.7 | 99.9 | 5.5 | 60.7 | 6.6 | 32.7 |
| Conven'l reactor | 99.5 | — | — | 8.1 | 74.0 | 5.2 | 20.8 |

The apparatus of FIG. 1 of the present invention directly produced substantially pure hydrogen as compared to the one produced from the conventional reactor which would require further separating steps to obtain pure hydrogen. Notice that the conversion rate of methanol in the apparatus of FIG. 1 of the present invention is slightly higher than that for the conventional reactor.

Figure 2:
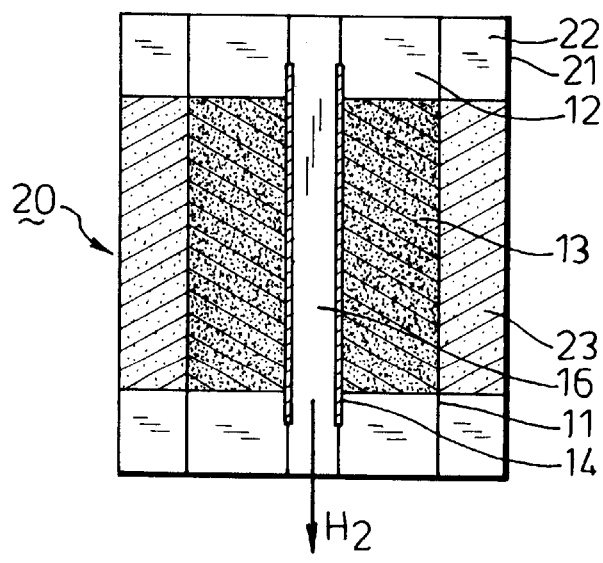
FIG. 2 is a schematic view which illustrates a double-jacket tubular reactor or apparatus constructed according to the present invention.

FIG. 2 illustrates a double-jacket tubular reactor 20 constructed according to the present invention. As compared to the single-jacket tubular reactor 10 of FIG. 1, the double-jacket tubular reactor 20 additionally comprises a shell 21 confining an oxidation chamber 22 which contains an oxidation catalyst bed 23 to surround the single-jacket tubular reactor 10 shown in FIG. 1. The oxidation chamber 22 is communicated, via a connecting means (not shown), with the reforming chamber. With the oxidation chamber, the non-permeated gas can be oxidized and converted to a non-polluting gas for emission.

EXAMPLE 4

Tests were done on the double-jacket tubular reactor 20 and the single-jacket tubular reactor 10 with the same operating conditions, except that an oxidation catalyst $Pd/Al_2O_3$, is used in the oxidation chamber of the double-jacket tubular reactor 20.

A Copper-zinc catalyst is used as a reforming catalyst bed. The reaction temperature and pressure in the reforming chamber are 350° C. and 6 atm, respectively. The feeding rate, i.e. WHSV, for methanol is set at 8 $h^{-1}$, and the steam to carbon ratio is 1.2:1. The air entering into the oxidation chamber for oxidation of the non-permeated gas has a GHSV (Gas hourly space velocity) of 1,200 $h^{-1}$.

The results of the tests are indicated below in TABLE VI.

TABLE VI

| | MeOH conv., | $H_2$ flux, | Effluent composition, vol % | | |
|---|---|---|---|---|---|
| | Wt % | $m^3/m^2$ – h | $H_2$ | CO | $CO_2$ |
| Double-jacket reactor | 100 | 2.6 | 25.9 | 4.6 | 69.5 |
| Single-jacket reactor | 100 | 2.7 | 60.7 | 6.6 | 32.7 |

There is a significant reduction in the amounts of the hydrogen and mono-carbon oxide in the effluent of the double-jacket tubular reactor 20, which is provided with the oxidation catalyst bed 23, as observed from the comparison in TABLE VI.

EXAMPLE 5

The influence of the feeding rate of methanol on the yield of hydrogen was investigated in this example. Experimental reactors and conditions used here are similar to those of Example 4, except for the WHSV of methanol and the load-to-surface ratio(ratio of the methanol feeding rate to the surface area of the palladium membrane). Results of the test in this example are shown below in TABLE VII.

TABLE VII

| WHSV of MeOH, $h^{-1}$ | Load-to-Surface Ratio, mol/h – $m^2$ | $H_2$ production rate, $m^3/h$ – $m^2$ | H recovery yield, % |
|---|---|---|---|
| 5 | 105 | 3.16 | 41 |
| 10 | 104 | 2.92 | 38 |
| 15 | 104 | 1.94 | 26 |

The hydrogen yield and production rate decrease as the WHSV of methanol increases, as observed from TABLE VII.

EXAMPLE 6

The influence of load-to-surface ratio on the hydrogen yield is determined in this example. Experimental reactor and conditions used here are similar to those of Example 4, except for the WHSV of methanol and the load-to-surface ratio. Results of this test are shown below in TABLE VIII.

TABLE VIII

| WHSV of MeOH $h^{-1}$ | Load-to-surface ratio, Mol/h – $m^2$ | $H_2$ production rate, $m^3/h$ – $m^2$ | H recovery yield, % |
|---|---|---|---|
| 5 | 103 | 2.74 | 36 |
| 5 | 52 | 2.54 | 66 |
| 10 | 204 | 2.87 | 19 |
| 10 | 104 | 2.92 | 38 |
| 15 | 155 | 2.26 | 20 |
| 15 | 78 | 1.82 | 32 |

TABLE VIII shows that hydrogen yield is doubled with half of the load-to-surface ratio.

EXAMPLE 7

The feasibility of the double-jacket tubular reactor 20 for clean emission is demonstrated in this example. The experimental reactor and conditions used here are similar to those of Example 4, except for the WHSV of methanol and the load-to-surface ratio. Results of this test are shown below in TABLE IX.

TABLE IX

| WHSV of MeOH, $h^{-1}$ | Load-to-surface ratio, Mole/h – $m^2$ | $H_2$ production rate, $m^3/h$ – $m^2$ | $H_2$ yield, % | Effluent composition, Vol % | | |
|---|---|---|---|---|---|---|
| | | | | $H_2$ | CO | $CO_2$ |
| 1 | 22 | 1.36 | 85 | 0 | 0 | 100 |
| 3 | 62 | 2.80 | 62 | 0 | 0 | 100 |
| 5 | 52 | 2.54 | 66 | 0 | 0 | 100 |
| 5 | 105 | 3.16 | 41 | 8.8 | 1.6 | 89.6 |

TABLE IX shows that the hydrogen and mono-carbon oxide of the non-permeable gas from the reformed gas can be completely converted into non-polluting gas for discharging to the environment.

EXAMPLE 8

Relation of the hydrogen yield with the reforming pressure was determined in this example. Experimental reactors and conditions used here are similar to those of example 4, except for the pressure in the reforming chamber. Results of this test are shown below in TABLE X.

TABLE X

| Pressure in reforming chamber, Atm | $H_2$ production rate, $m^3/h - m^2$ | $H_2$ yield, % |
|---|---|---|
| 3 | 0.53 | 7 |
| 6 | 2.92 | 38 |
| 9 | 3.25 | 42 |

Hydrogen yield increases with increasing reaction pressure as indicated in TABLE X.

EXAMPLE 9

Relation of hydrogen yield with the reforming temperature is determined in this example. Experimental reactor and conditions used here are similar to those of example 4, except for the temperature in the reforming chamber. Results of this test are shown below in TABLE XI.

TABLE XI

| Temperature in reforming chamber, °C. | $H_2$ production rate, $m^3/h - m^3$ | $H_2$ recovery yield, % |
|---|---|---|
| 325 | 2.40 | 32 |
| 350 | 2.92 | 38 |
| 375 | 3.14 | 41 |

Hydrogen yield increases with increasing reaction pressure as indicated in TABLE XI.

Figure 3:
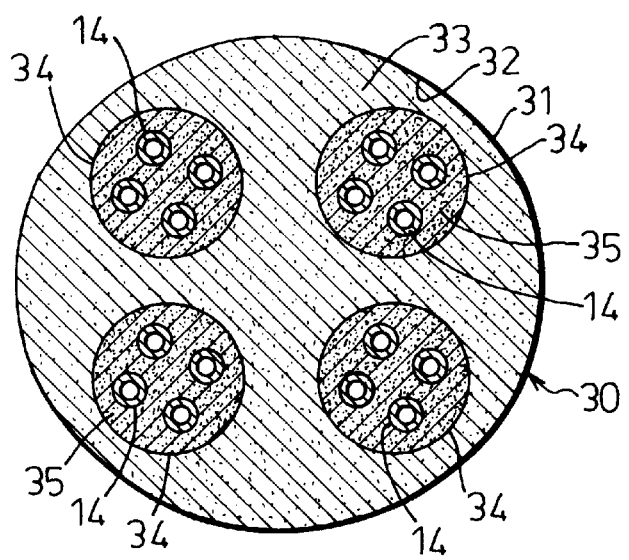
FIG. 3 is a schematic view of a multi-core apparatus constructed according to the present invention.

Referring to FIG. 3, there is shown a multi-core apparatus 30 constructed according to the present invention for producing high purity hydrogen. The multi-core apparatus 30 comprises a shell 31 which confines an oxidation chamber 32 to receive an oxidation catalyst bed 33. Four tubular members 34 are disposed in the oxidation chamber 32 and are surrounded by the oxidation catalyst bed 33. Each tubular member 34 receives a reforming catalyst bed 35 and a hydrogen-permeable membrane tube 14. The membrane tubes 14 are spaced apart from the oxidation catalyst bed 33.

Figure 4:
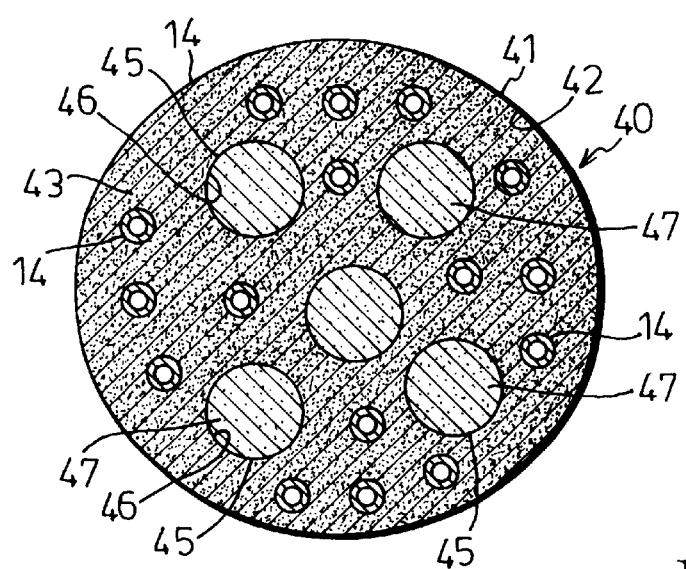
FIG. 4 is a schematic view of another multi-core apparatus constructed according to the present invention.

As illustrated in FIG. 4, another multi-core apparatus 40 constructed according to the present invention for producing high purity hydrogen includes a shell 41 which confines a reforming chamber 42 filled with a reforming catalyst bed 43. Five tubular members 45 are disposed at intervals in the reforming chamber 42, and are surrounded by the reforming catalyst bed 43. Each tubular member 45 confines an oxidation chamber 46 which is provided with an oxidation catalyst bed 47. A plurality of membrane tubes 14 are also disposed at intervals within the reforming catalyst bed 43. The membrane tube 14 are spaced apart from the oxidation catalyst bed 47.

The invention shall not be limited by the embodiments described above, which are exemplary and which can be modified in various ways within the scope of protection defined by the appended patent claims.

We claim:

1. A process for producing high purity hydrogen by steam-reforming a carbonaceous fuel, comprising the steps of:

providing a double jacket reactor which comprises:
a palladium membrane tube comprising a porous stainless steel support and a palladium layer plated on a surface of said steel support, said palladium layer having a thickness of 1 to 20 $\mu$m;
a reforming chamber loaded with a copper-based reforming catlyst bed, wherein said reforming chamber surrounds said membrane tube; and
an oxidation chamber loaded with a palladium-based oxidation catalyst bed, wherein said oxidation chamber surrounds said reforming chamber, and wherein said membrane tube confines a hydrogen compartment;

feeding a mixture of methanol and steam, said mixture having a steam-to-carbon mole ratio of 1:1 to 2:1 and a WHSV of 8 $hr^{-1}$ or less for the methanol, into said reforming catalyst bed to undergo a steam-reforming reaction at a temperature of from 250 to 375° C. and a pressure of 3 to 9 atm, thereby producing hydrogen and other reformed gases, wherein a portion of said hydrogen instantaneously permeates into said hydrogen compartment with a flow rate of 0.53 to 3.25 $m^3/hr$-$m^2$; and feeding air into said combustion catalyst bed and allowing the hydrogen which did not permeate into said hydrogen compartment and said other reformed gases to enter from said reforming chamber into said combustion catalyst bed to undergo a catalytic oxidation, thereby converting said hydrogen which did not permeate into said hydrogen compartment and said other reformed gases into non-polluting gases and providing heat for the steam-reforming reaction.

2. The process of claim 1, wherein the porous stainless steel support has a filtration grade of 0.5 $\mu$m.

3. The process of claim 1, wherein the palladium layer has a thickness of 15 $\mu$m.

4. The process of claim 1, wherein the porous stainless steel support has a thickness in the range from 0.5 to 2 mm.

5. The process of claim 1, wherein the mixture of methanol and steam has a steam-to-carbon mole ratio in the range of 1.2:1.

6. The process of claim 1, wherein the temperature of the steam-reforming reaction is about 350° C.

7. The process of claim 1, wherein the air has a GHSV of about 1200 $hr^{-1}$.

* * * * *